United States Patent Office 3,467,119
Patented Sept. 16, 1969

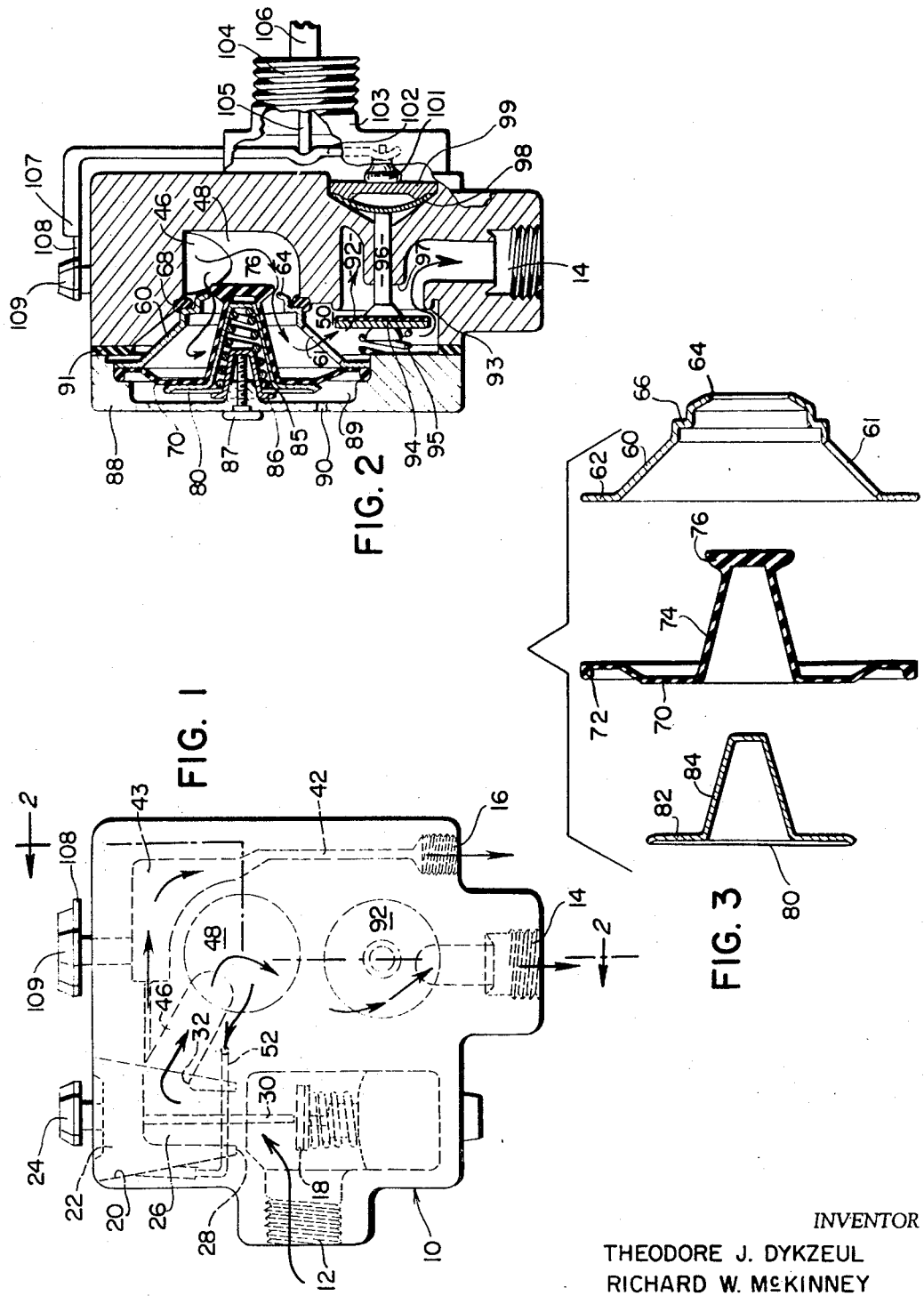

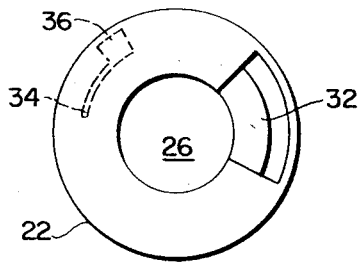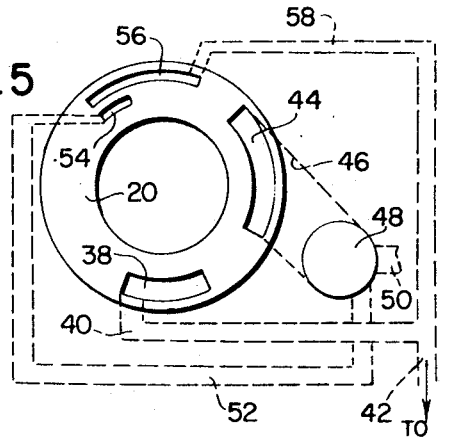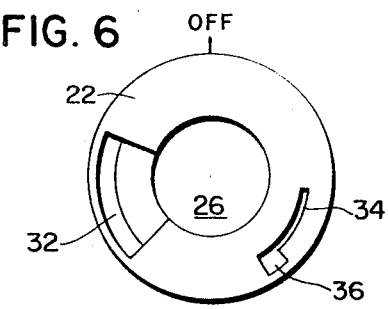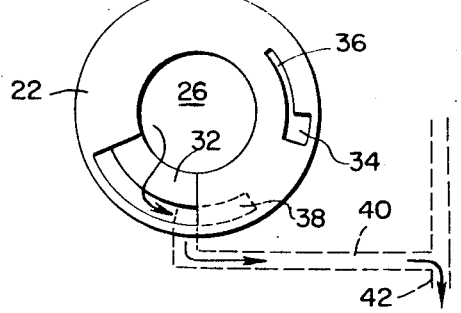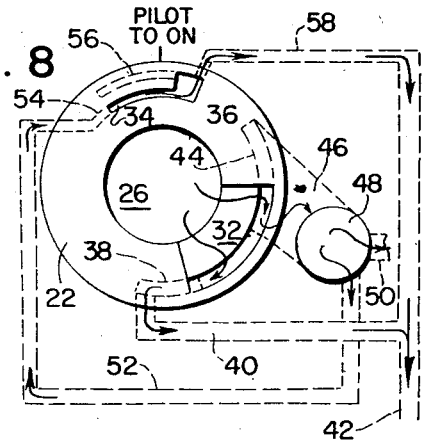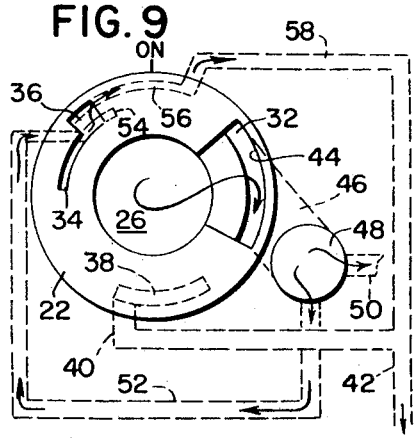

3,467,119
THERMOSTATIC CONTROL DEVICE
Theodore J. Dykzeul, Rolling Hills, and Richard W. McKinney, Lakewood, Calif., assignors to Robertshaw Controls Company, Richmond, Va., a corporation of Delaware
Filed Feb. 17, 1967, Ser. No. 616,841
Int. Cl. F23d 13/46, 13/02
U.S. Cl. 137—66    13 Claims

ABSTRACT OF THE DISCLOSURE

A fluid flow control device including a casing having an inlet, a main flow outlet and a pilot flow outlet and a manually operable plug valve and pressure regulating valve disposed in the casing for controlling a flow of gas to burner apparatus which conventionally includes a main burner and a pilot burner igniting proximity thereto; the manual plug valve is provided with special porting to deliver a nonregulated pilot flow of gas during the lighting of the pilot burner and provides pressure regulation of both the main and the pilot gas flows during normal operation of the main burner.

---

This invention relates to fluid flow control devices and more particularly to such a device for controlling, and regulating the pressure of a fluid flow to main and pilot burner apparatus.

It has become conventional practice to provide a thermostatic control device with an integrated pressure regulating means as exemplified in U.S. Patent No. 3,133,556. However, in such a control device, only the main flow of fuel is pressure regulated while the pilot flow of fuel is not pressure regulated. While it is desirable that the pilot flow of fuel be subject to pressure regulation during normal operation, the use of nonregulated pilot flow is required by this device during lighting of the pilot burner.

It is, therefore, an object of the present invention to provide a fluid flow control device with pressure regulated main and pilot flow means and with a nonregulated pilot flow means.

Another object of this invention is to provide manual control of both nonregulated and regulated pressure flows in a fluid flow control device.

Another object of this invention is to supply both regulated and nonregulated pressure flows to a pilot burner while the manual control is being moved to its "on" position.

The present invention has another object in that the manually operable plug valve of a thermostatic control device is provided with a plurality of flow passages to establish fuel flows to pilot flow means alone and to both pilot flow means and to pressure regulating means.

It is another object of this invention to provide a fluid flow control device with an economical, simply constructed pressure regulator that is easily assembled in the control device casing.

Another object of this invention is to construct a pressure regulator with its own valve member and valve seat for unitary assembly in control device casing.

A further object of the present invention is to provide the flexible diaphragm of pressure regulator with an integrally formed valve member.

In practicing the present invention, a fluid control device is provided with a casing having inlet means, main outlet means and pilot outlet means, pressure regulating means in the casing to regulate the pressure of a fluid flow to the main and pilot outlet means, manual valve means in the casing being movable between a plurality of controlling positions to control fluid flows through the casing, and pilot flow bypass means in the casing bypassing the pressure regulating means and communicating with the pilot outlet means, said manual valve means controlling the pilot flow bypass means and being movable to one of its controlling positions for permitting a fluid flow without pressure regulation through the pilot flow bypass means to the pilot outlet means.

Other objects and advantages of the present invention will become apparent from the following description of a preferred embodiment, taken in connection with the accompanying drawings wherein:

FIG. 1 is a front elevation, with parts in dashed lines to show flow passages, of a thermostatic control device embodying the present invention;

FIG. 2 is a partial section view taken substantially along the staggered line 2—2 of FIG. 1;

FIG. 3 is an exploded cross sectional view of details of FIG. 2;

FIG. 4 is a schematic top view of a manually rotatable plug valve utilized in FIG. 1;

FIG. 5 is a schematic top view of the cavity in FIG. 1, which receives the plug valve of FIG. 4, with dashed lines to indicate the flow passages;

FIG. 6 is a schematic top view of the plug valve of FIG. 1 shown in its "off" position;

FIG. 7 is a schematic top view showing the plug valve of FIG. 4 rotated in the cavity of FIG. 5 to a "pilot" position where there is flow only to the pilot outlet;

FIG. 8 is a schematic top view showing the plug valve of FIG. 4 in an intermediate position in the cavity of FIG. 5 while being rotated from "pilot" to "on" positions wherein there is a dual flow to the pilot outlet and a partial flow to the main outlet; and FIG. 9 is a schematic top view showing the plug valve of FIG. 4 rotated in the cavity of FIG. 5 to an "on" position where there is a single flow to the pilot outlet and a fuel flow to the main outlet.

As is illustrated in FIG. 1, the present invention is embodied in a thermostatic control device including a casing, indicated at 10, having an inlet 12, a main outlet 14 for supplying fuel to a main burner (not shown) and a pilot outlet port 16 for supplying fuel to a pilot burner (not shown). A thermoelectric safety valve 18 is positioned to control the inlet 12; such safety devices are well known in the art and a detailed description is being omitted for the sake of brevity except to note that the electromagnet thereof is a holding magnet which is energized by means of a thermocouple disposed in the flame of the pilot burner. Downstream of the safety valve 18, the casing 10 has a frustoconical cavity or bore 20 which is opened at its bottom to communicate with the inlet 12.

A manually operated, tapered plug valve 22 is rotatably seated in the bore 20 and is biased therein by a coil spring (not shown) mounted in compression between the large end of plug valve 22 and a top wall or cover on casing 10. A plug valve stem centrally extends from the large end of plug valve 22 through a suitable bore in such top wall and a manually operable knob 24 is keyed to the exterior end of the plug valve stem for rotating the plug valve 22. The bottom wall of plug valve 22 is hollowed out to define a chamber 26 and the truncated end defines an annular valve seat 28 which cooperates with the safety valve 18 to control fluid flow from the inlet 12 to the plug valve chamber 26. A reset stem 30 carried by the plug valve stem and being depressable with the knob 24, centrally extends through the bore 26 to engage the safety valve 18 during a resetting operation. The combined plug valve and safety valve construction has not been described in detail because such construction may take any suitable form well known in the art; e.g., see U.S. Patent No. 3,002,519.

Intermediate its ends, the plug valve 22 (see FIG. 4) has a lateral port 32 permitting flow from the plug valve chamber 26. Circumferentially and axially spaced from lateral port 32, the plug valve 22 has a peripheral opening of generally L-shaped configuration defined by an arcuate groove 34 which terminates in a radially enlarged groove 36.

The plug valve 22 is manually rotated between a plurality of controlling positions to provide selective registry with its passages and a plurality of flow passages which open into the bore 20. These flow passages in the casing 10, are schematically illustrated in FIG. 5 to show their proper relationship to the outlets 14 and 16. An arcuately shaped pilot port 38 opens into the bore 20 and has one end portion communicating with a bypass pilot flow passage 40 that joins a pilot flow outlet conduit 42 having a filter 43 therein and leading to the pilot outlet 16. Circumferentially spaced from pilot port 38, a larger arcuately shaped main port 44 opens into the bore 20 and oppositely communicates with a main flow passage 46 that leads to a pressure regulating chamber 48. Downstream of the chamber 48, a first flow passage 50 leads to a thermostatic valve chamber which communicates with the main outlet 14 and a second flow passage 52 defining a loop conduit which communicates with an arcuate port 54 opening into the bore 20. The port 54 is axially and circumferentially spaced from the ports 38 and 44 and as viewed in FIG. 5 is radially spaced from an adjacent arcuate port 56 which has a greater arcuate length than port 54 so that its extension communicates with a second pilot flow passage 58 that joins the pilot flow outlet conduit 42. The plug valve 22 of FIG. 4 is rotatably disposed in the bore 20 of FIG. 5 as will be described more fully hereinafter.

As is illustrated in FIG. 2, and FIG. 3, the pressure regulating chamber 48 includes a generally frustoconical housing 60, stamped from suitable sheet material, such as aluminum, having annular mounting flange 62 on its large end. The truncated end of housing 60 defines an annular valve seat 64 and spaced slightly from such seat 64, the conical wall of housing 60 is deformed to provide an annular L-shaped shoulder 66 that is forced into sealing engagement with an O-ring gasket 68, made of any suitable resilient material, such as rubber, and held against the annular wall which is part of the casing chamber 48. The lower part of conical housing 60 (as viewed in FIGS. 2 and 3) is cut out to define an outlet 61 from the housing 60.

A flexible diaphragm 70, made of rubber or the like has a beaded annular flange 72 on its outer periphery for mounting and sealing purposes. The central portion of diaphragm 70 has a hollow frustoconical shape 74, the truncated end of which is flared to define a valve member 76; as shown in FIG. 2, the valve member 76 is disposed on the upstream side of the valve seat while the diaphragm 70 is disposed on the downstream side thereof. A backup plate or pan 80 has a generally cup-shaped configuration with an annular lip 82 engaging a portion of the diaphragm 70 and with a frustoconical wall 84 disposed in the similarly shaped diaphragm conical portion 74.

A helically coiled spring 85 is disposed in the conical cup 84 and is mounted in compression between the bottom wall thereof and the peripheral flange of a similarly shaped spring retainer 86. An adjustment screw 87 extends through a threaded boss on the front cover 88 of the casing 10 for selectively varying the bias that the spring 85 exerts on the diaphragm 70. The left side of the diaphragm 70 (as viewed in FIG. 2) defines an atmospheric chamber 89 which communicates with the atmoshpere through a vent aperture 90 in the cover 88. The entire diaphragm assembly is assembled as a unit with the housing flange 62 being fixed to the cover 88 as by being staked or press-fitted into a recess in the cover 88 which is then sealed against the front wall of casing 10 by means of a gasket 91 and secured thereto as by threaded cap screws (not shown).

The regulator housing outlet 61 communicates with the flow passage 50 that is separated from the thermostatic valve chamber 92 by means of an annular valve seat 93 to control the main flow to main outlet 14. A main valve disc 94 is biased toward the valve seat 93 by a coil spring 95 which is mounted in compression between the valve disc 94 and the adjacent surface of the casing cover 88. A valve stem 96 protrudes centrally through the valve seat 93 and slidably extends through a bored boss 97 on the rear wall of casing 10. The end of valve stem 96 protrudes into a counterbore on the rear wall of casing 10, which houses a snap acting mechanism comprising a bowed snap disc 98 mounted on the annular knife edged fulcrum of a relatively thick disc 99 which is movable in such counterbore. Such snap acting mechanisms are well known in the art and may have any suitable construction.

The snap acting mechanism is actuated by a thrust button 101 carried on the end of a lever 102 that is carried by a mounting shank 103. The shank 103 is secured to the rear wall of casing 10 as by threaded cap screws (not shown) and includes an externally threaded boss 104 for attaching the entire control device to a heating appliance, such as the tank of a hot water heater. A thermostatic unit of any suitable type, such as an inner rod 105 of Invar or the like and an outer concentric tube 106 of copper or the like is carried by the boss 104 so that the inner end of the rod 105 engages an intermediate portion of the lever 102; such a rod and tube thermostat is so well known that further description is unnecessary. The lever 102 protrudes out of a guide slot in the mounting shank 103 and has a perpendicularly bent end 107 which lies over the top of casing 10 (FIG. 2). The lever end 107 is engaged by a rotatable cam 108 secured to the stem of a temperature setting dial 109.

In the following description of the sequence of operation of the above control device, it will be assumed that the control is attached to a hot water heater and that the temperature setting dial 109 has been set at a desired water temperature, e.g., 140° F. FIG. 6 represents the "off" position of the plug valve 22 wherein none of the ports thereof are in registry with any of the openings in the bore 20; accordingly, the nonregistered flow passages 40, 46, 52 and 58 in casing 10 are not shown. To commence operation, the reset knob 24 is rotated from its "off" position to its "pilot" position whereby the plug valve 22 is rotated from the FIG. 6 position approximately 45° counterclockwise to the FIG. 7 position. Since only the bypass pilot flow 40 and the plug valve port 32 are in registry, the nonregistered flow passages 46, 52 and 58 in the casing 10 are not shown. Upon depression of the reset knob 24, the safety valve 18 is displaced from the plug valve seat 28 and a pilot flow of fuel may be traced from inlet 12 through valve seat 28, plug valve chamber 26, plug valve port 32, bore opening 38, bypass pilot flow passage 40, outlet pilot flow passage 42, and the pilot outlet 16 to the pilot burner which is then ignited as by a match. As soon as the pilot burner has heated the thermocouple and the coil of the electromagnet has been energized, the reset knob 24 released whereupon the safety valve 18 will be held in its open position. During this lighting operation, the plug valve 22 is not in position to permit a flow of fuel to the main bore opening 44 so there is no flow to the main outlet 14, even though the automatically operated valve 94 be in an open position, thus assuring a safe lighting condition. An additional safe lighting feature may be associated with the reset knob 24, i.e., a cooperating projection and cutout between the knob and the top of casing 10 to prevent reset depression of the knob 24 except when it is in its "pilot" position.

After release of the reset knob 24, it is then rotated from its "pilot" position to its "on" position. During such rotation, the plug valve 22 does not shut-off the nonregulated flow to the bypass pilot conduit 40 until after the regulated flow to pilot conduit 58 has been established; thus, there is a period when regulated and nonregulated pilot flows are simultaneously established. Such an arrangement is shown in FIG. 8 wherein plug valve port 32 spans both the bypass pilot port 38 and the main port 44. The bypass pilot flow continues as described above and the regulated pilot flow may now be traced from plug valve port 32 through the bore port 44, main flow passage 46, pressure regulating chamber 48, pilot flow passage 52, bore port 54, plug valve ports 34 and 36, bore port 56 and pilot flow passage 58 to the pilot outlet flow passage 42 where it is mixed with the nonregulated pilot flow from the bypass pilot conduit 40 for delivery to the pilot outlet 16 and the pilot burner. Such an arrangement assures a continuous flow of fuel to the pilot burner during rotation of the plug valve 22.

When the plug valve 22 is completely rotated to its "on" position, as illustrated in FIG. 9, the bypass pilot opening 38 is closed off so there is no bypass nonregulated flow to the bypass conduit 40. However, the main port 44 is in registry with the plug valve port 32 and the spaced pilot passageway openings 54 and 56 are in registry with the plug valve port 36 so there is a pressure regulated main flow to the main passageway 50 and a pressure regulated pilot flow to the pilot passageway 58.

The pressure regulated main flow from the main passageway 50 is controlled by the automatically operated valve 94; e.g., with the temperature condition sensed by the thermostat 105–106 being lower than the desired temperature which has been preset by the dial 109 (FIG. 2), the rod 105 has caused movement of the lever button 101 so that the snap acting mechanism 98–99 has opened the main valve 94. Thus, in the FIG. 2 arrangement, there is a demand for heat so there is a pressure regulated main flow through the main valve seat 93 and chamber 92 to the main outlet 14. When the temperature requirements in the medium being temperature controlled are satisfied, the valve 94 is closed. The valve 94 will thus cycle automatically in response to temperature variations sensed by the thermostat 105–106.

In the event the pilot burner should become inoperative as evidenced by extinguishment of the flame thereat, the thermocouple will cool and the electromagnetic coil of the safety device 18 will be deenergized causing closure of the safety valve. Since the safety valve is upstream of the plug valve 22, all fuel flows to the pilot burner and the main burner are cut off. To reestablish the flame at the pilot burner, the igniting procedure outlined above must be repeated; i.e., the knob 24 must be rotated to its "pilot" position before it can be depressed to move the safety valve 18 to an open position.

Inasmuch as the present invention is subject to many modifications, variations and changes in detail, it is intended that all matter contained in the foregoing description of the preferred embodiment or shown on the accompanying drawing shall be interpreted as illustrative and not in a limiting sense.

What is claimed is:

1. In a fluid flow control device, the combination comprising
a casing having inlet means, main outlet means and pilot outlet means,
pressure regulating means in said casing to regulate the pressure of a fluid flow to said main and pilot outlet means,
manual valve means in said casing being movable between a plurality of controlling positions to control fluid flows through said casing, and
pilot flow bypass means in said casing bypassing said pressure regulating means and communicating with said pilot outlet means,
said manual valve means controlling said pilot flow bypass means and being movable to one of said controlling positions which prevents any fluid flow to said main outlet means but permits a fluid flow without pressure regulation through said pilot flow bypass means to said pilot outlet means.

2. The invention as recited in claim 1 wherein said manual valve means has "off," "pilot" and "on" controlling positions and includes a plurality of flow passage means, and one of said flow passage means permits flow to said pilot flow bypass means when said manual valve means is in its "pilot" position.

3. In a fluid flow control device, the combination comprising
a casing having inlet means, main outlet means and pilot outlet means,
pressure regulating means in said casing to regulate the pressure of a fluid flow to said main and pilot outlet means,
pilot flow bypass means in said casing bypassing said pressure regulating means and communicating with said pilot outlet means,
manual valve means in said casing being movable between "off," "pilot" and "on" controlling positions to control fluid flows through said casing,
said manual valve means including plurality of flow passage means, one of which permits fluid flow without pressure regulation to said pilot flow bypass means when said manual valve means is in its "pilot" position, and
said casing including pilot flow conduit means downstream of said pressure regulating means and communicating with said pilot outlet means and wherein another of said flow passage means in said manual valve means controls said pilot flow conduit means, said one flow passage means permitting flow to both said pilot flow bypass means and said pressure regulating means and said another flow passage means permitting flow to said pilot flow conduit means when said manual valve is being moved between "pilot" and "on" positions whereby both nonregulated and regulated pressure flows are supplied to said pilot outlet means.

4. The invention as recited in claim 1 wherein said manual valve means comprises a rotary plug valve disposed upstream of said pressure regulating means and having first and second pilot flow port means, said first pilot flow port means establishing the fluid flow through said pilot flow bypass means, and said second pilot flow port means permitting fluid flow to the pilot outlet means independently of said pilot flow bypass means.

5. In a fluid flow control device, the combination comprising
a casing having inlet means, main outlet means and pilot outlet means.
pressure regulating means in said casing to regulate the pressure of a fluid flow to said main and pilot outlet means,
pilot flow bypass means in said casing bypassing said pressure regulating means and communicating with said pilot outlet means,
manual valve means in said casing being movable between a plurality of controlling positions to control fluid flows through said casing,
said manual valve means comprising a rotary plug valve disposed upstream of said pressure regulating means and having first and second pilot flow port means, said first pilot flow port means permitting a fluid flow without pressure regulation through said pilot flow bypass means to said pilot outlet means, and said second pilot flow port means permitting fluid flow to the pilot outlet means independently of said pilot flow bypass means, and
said casing including pilot flow conduit means extending from said pressure regulating means to said pilot outlet means and being intersected by the second pilot flow port means of said rotary plug valve whereby the fluid flow through said pilot flow conduit means is controlled by said rotary plug valve.

6. In a fluid flow control device, the combination comprising
a casing having an inlet, a main outlet and a pilot outlet,
manual valve means in said casing controlling a fluid flow from said inlet and being movable between "off," "pilot" and "on" positions,
a main passageway in said casing extending from said manual valve means to said main outlet,
a pilot passageway in said casing extending from said main passageway to said pilot outlet,
a bypass pilot conduit in said casing extending from said manual valve means to said pilot outlet and bypassing said main passageway,
a first port means in said manual valve means permitting a fluid flow to said bypass pilot conduit when said manual valve means is in its "pilot" position,
said first port means also permitting a fluid flow to said main passageway when said manual valve means is in its "on" position,
second port means in said manual valve means permitting a fluid flow in said pilot passageway when said manual valve means is in its "on" position,
said manual valve means shutting off all fluid flows when in its "off" position, and
pressure regulating means in said main passageway upstream of said pilot passageway whereby the fluid flows to said main and pilot outlets are pressure regulated when said manual valve means is in its "on" position and whereby the fluid flow to said pilot outlet is without pressure regulation when said manual valve means is in its "pilot" position.

7. The invention as recited in claim 6 wherein said first port means permits fluid flows to said bypass pilot conduit and to said main passageway when said manual valve means is in an intermediate position between its "pilot" and "on" positions while being moved therebetween.

8. The invention as recited in claim 7 wherein said second port means permits a fluid flow through said pilot passageway when said manual valve means is in its intermediate position whereby said pilot outlet is simultaneously supplied with pressure regulated and pressure non-regulated fluid flow during movement of said manual valve means between its "pilot" and "on" positions.

9. The invention as recited in claim 6 wherein said casing includes means defining a bore communicating with said inlet, said main passageway includes an opening communicating with said bore, said bypass conduit includes an opening communicating with said bore in spaced relation to said main passageway opening, said pilot passageway includes a pair of spaced openings communicating with said bore and being in spaced relation to said main passageway opening and to said bypass conduit opening, and wherein said manual plug valve means comprises a plug valve rotatably disposed in said bore for selective control of said opening.

10. The invention as recited in claim 9 wherein said plug valve comprises a central chamber open at one end to communicate with said inlet, said first port means includes an arcuately shaped port laterally extending through said plug valve to establish communication between said central chamber and said main passageway opening and said bypass conduit opening, and said second port means includes an arcuately shaped port in the periphery of said plug valve and having an enlarged portion to span the pair of spaced openings in said pilot passageway.

11. The invention as recited in claim 10 when safety means is operatively disposed in said casing upstream of said plug valve to control a fluid flow from said inlet to said central chamber.

12. The invention as recited in claim 11 wherein automatic valve means is disposed in said casing to control said main passageway upstream of said main outlet.

13. The invention as recited in claim 12 wherein said automatic valve means includes temperature responsive means to control the fluid flow to said main outlet in accordance with variations from a predetermined temperature condition.

References Cited

UNITED STATES PATENTS

| | | | |
|---|---|---|---|
| 2,016,234 | 10/1935 | Hughes | 137—505.41 |
| 2,058,951 | 10/1936 | Buirk | 137—505 |
| 2,515,229 | 7/1950 | Jenkins | 137—66 |
| 3,109,449 | 11/1963 | Flagg | 137—66 |

WILLIAM F. O'DEA, Primary Examiner

HOWARD M. COHN, Assistant Examiner

U.S. Cl. X.R.

137—66, 599, 614.19; 239—92